(12) United States Patent
Hsu

(10) Patent No.: US 10,106,217 B1
(45) Date of Patent: Oct. 23, 2018

(54) SADDLE DEVICE

(71) Applicant: Hsin-Hsiang Hsu, Changhua (TW)

(72) Inventor: Hsin-Hsiang Hsu, Changhua (TW)

( * ) Notice: Subject to any disclaimer, the term of this patent is extended or adjusted under 35 U.S.C. 154(b) by 0 days.

(21) Appl. No.: 15/686,806

(22) Filed: Aug. 25, 2017

(30) Foreign Application Priority Data

Apr. 19, 2017 (TW) .............................. 106113092 A

(51) Int. Cl.
*B62J 1/00* (2006.01)
*B62J 1/08* (2006.01)
*B62J 1/10* (2006.01)

(52) U.S. Cl.
CPC ................ *B62J 1/10* (2013.01); *B62J 1/005* (2013.01); *B62J 1/007* (2013.01)

(58) Field of Classification Search
CPC ............... B62J 1/10; B62J 1/005; B62J 1/007
USPC ................... 297/195.12, 201, 215.11, 215.12
See application file for complete search history.

(56) References Cited

U.S. PATENT DOCUMENTS

| | | | | |
|---|---|---|---|---|
| 608,682 A * | 8/1898 | Jamieson | .................. | B62J 1/005 297/201 |
| 616,178 A * | 12/1898 | Barron | ..................... | B62J 1/005 297/201 |
| 629,956 A * | 8/1899 | Craig | ....................... | B62J 1/005 297/201 |
| 694,875 A * | 3/1902 | Meighan | .................. | B62J 1/005 297/201 |
| 3,243,231 A * | 3/1966 | Duffy | ....................... | B62J 1/002 297/202 |
| 4,063,775 A * | 12/1977 | Mesinger | ................. | B62J 1/002 297/201 |
| 4,512,608 A * | 4/1985 | Erani | ....................... | B62J 1/005 297/201 X |
| 4,541,668 A * | 9/1985 | Rouw | ...................... | B62J 1/002 297/201 |
| 5,203,606 A * | 4/1993 | Granzotto | ................. | B62J 1/00 297/201 |
| 6,068,333 A * | 5/2000 | Dixon | ...................... | B62J 1/002 297/201 X |
| 6,183,043 B1 * | 2/2001 | Nelson | ..................... | B62J 1/005 297/201 |
| 6,554,355 B2 * | 4/2003 | Kaptur | ..................... | B62J 1/005 297/201 X |
| 6,575,529 B1 * | 6/2003 | Yu | ............................ | B62J 1/005 297/201 |
| 7,178,869 B2 * | 2/2007 | Ljubich | ...................... | B62J 1/00 297/201 |
| 7,494,181 B2 * | 2/2009 | Tucker | ..................... | B62J 1/005 297/201 X |

(Continued)

*Primary Examiner* — Rodney B White
(74) *Attorney, Agent, or Firm* — Birch, Stewart, Kolasch & Birch, LLP

(57) ABSTRACT

A saddle device includes a first seat unit, a second seat unit mounted to and disposed behind the first seat unit, a saddle unit mounted to the second seat unit, and having a top surface unit, and a supporting member connected to the first seat unit, disposed behind the second seat unit, having a rear mounting end portion that is distal from the first seat unit, and transformable between a lifted position and a lowered position such that, when the supporting member is at the lifted position, the rear mounting end portion is located above the top surface unit of the saddle unit, and when the supporting member is at the lowered position, the rear mounting end portion is located below the top surface unit of the saddle unit.

8 Claims, 10 Drawing Sheets

(56) References Cited

U.S. PATENT DOCUMENTS

| | | | | |
|---|---|---|---|---|
| 7,500,717 B2* | 3/2009 | Bigolin | .................... | B62J 1/005 |
| | | | | 297/201 |
| 7,581,787 B2* | 9/2009 | Livne | ....................... | B62H 5/00 |
| | | | | 297/201 |
| 7,628,451 B2* | 12/2009 | Chuang | .................... | B62J 1/005 |
| | | | | 297/201 |
| 8,047,604 B2* | 11/2011 | Chuang | .................... | B62J 1/007 |
| | | | | 297/201 |
| 9,056,642 B2* | 6/2015 | Onyeka | .................... | B62J 1/005 |
| 9,493,203 B2* | 11/2016 | Portz | ........................ | B62J 1/005 |
| 9,663,166 B2* | 5/2017 | Hamel | ..................... | B62J 1/007 |
| 2012/0086246 A1* | 4/2012 | Belliveau | ................. | B62J 1/00 |
| | | | | 297/201 |
| 2017/0233020 A1* | 8/2017 | Goff | ........................ | B62J 1/005 |
| | | | | 297/201 |

* cited by examiner

SADDLE DEVICE

CROSS-REFERENCE TO RELATED APPLICATION

This application claims priority of Taiwanese Patent Application No. 106113092, filed on Apr. 19, 2017.

FIELD

The disclosure relates to a bicycle member, and more particularly to a saddle device that is mounted to a bicycle frame.

BACKGROUND

A conventional saddle device disclosed in U.S. Pat. No. 694,875 includes a bottom seat, a shaft rod mounted to the bottom seat, and two saddles threadedly connected to the shaft rod. Each of the saddles has a front end portion, and a rear end portion opposite to the front end portion, and disposed for mounting the shaft rod. Two ends of the shaft rod respectively have a right-handed thread section and a left-handed thread section. The saddles are respectively and threadedly connected to the right-handed thread section and the left-handed thread section of the shaft rod.

When the shaft rod rotates, the right-handed thread section and the left-handed thread section cooperate to drive a relative movement between the saddles for adjusting a distance between the saddles.

Even if the conventional saddle device can adjust the distance between the saddles, for most of bicycles, a portion of a bicycle for mounting the saddles is fixed such that, the positions of the saddles in a front-rear direction are not adjustable for different users.

In addition, a user usually requires some repair tools and repair members for repairing the bicycle, and usually needs to bring a wallet, since the structure of the bicycle frame is simple, it is difficult to mount a bag on a bicycle frame near a saddle portion of the bicycle for receiving the repair tools, the repair members and the wallet.

Moreover, the conventional saddle device disclosed in U.S. Pat. No. 694,875 does not include a coupling structure for mounting a saddle bag, and a backrest structure for supporting the back of the user.

SUMMARY

Therefore, the object of the disclosure is to provide a saddle device that can be adjusted based on the requirement of a user.

According to the disclosure, the saddle device includes a first seat unit, a second seat unit, a saddle unit, a supporting member and a backrest. The first seat unit has a track portion extending in a front-rear direction. The second seat unit is mounted to and disposed behind the first seat unit, and is movable on the first seat unit in the front-rear direction. The saddle unit is mounted to the second seat unit, and has a top surface unit. The supporting member is connected to the first seat unit, has a rear mounting end portion distal from the first seat unit and disposed behind the second seat unit, and is transformable between a lifted position and a lowered position such that, when the supporting member is at the lifted position, the rear mounting end portion is located above the top surface unit of the saddle unit, and when the supporting member is at the lowered position, the rear mounting end portion is located below the top surface unit of the saddle unit. The backrest is mountable to the rear mounting end portion when the supporting member is at the lifted position, such that the backrest is disposed behind the saddle unit.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
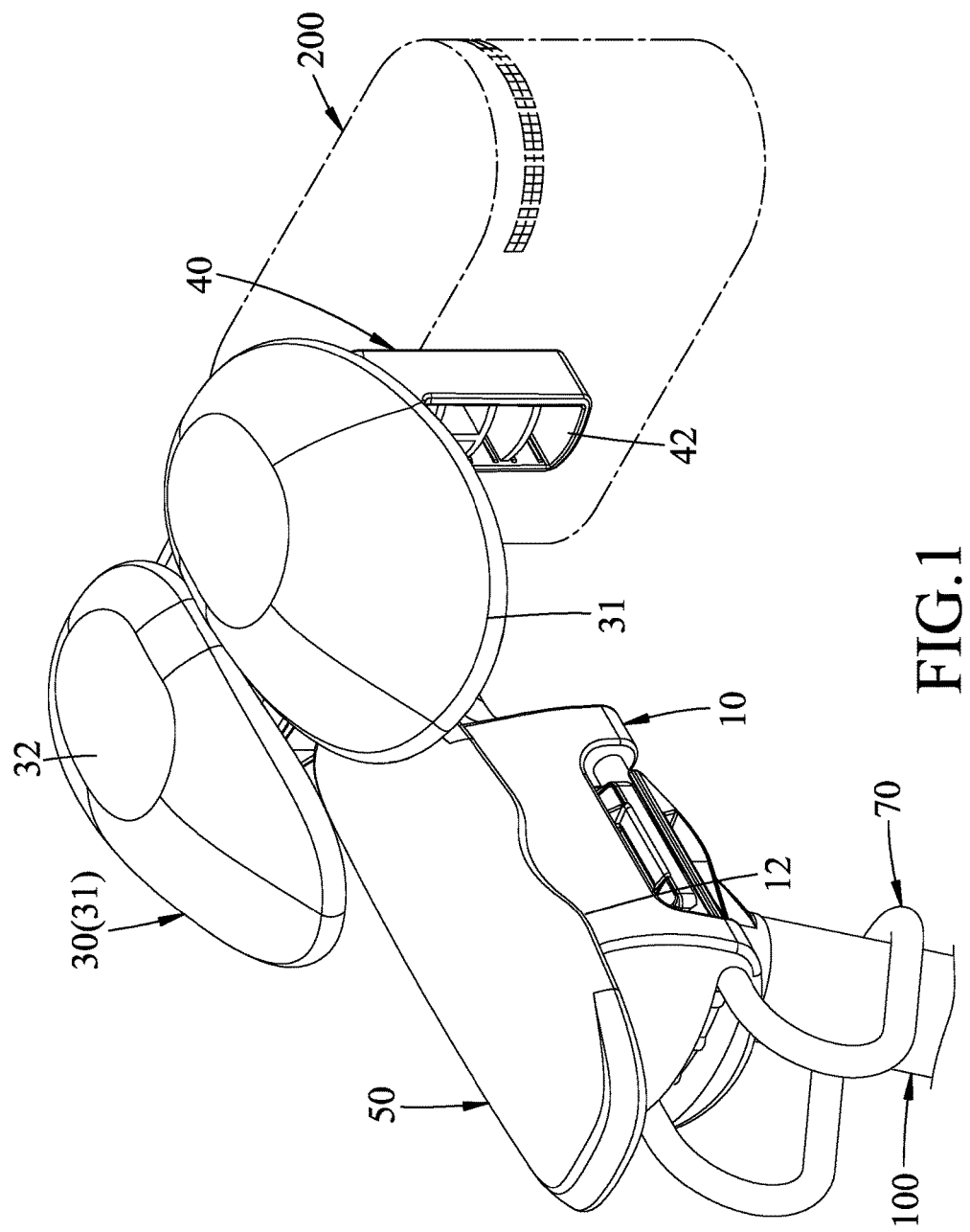
FIG. 1 is a perspective view of a first embodiment of a saddle device according to the disclosure.
Figure 2:
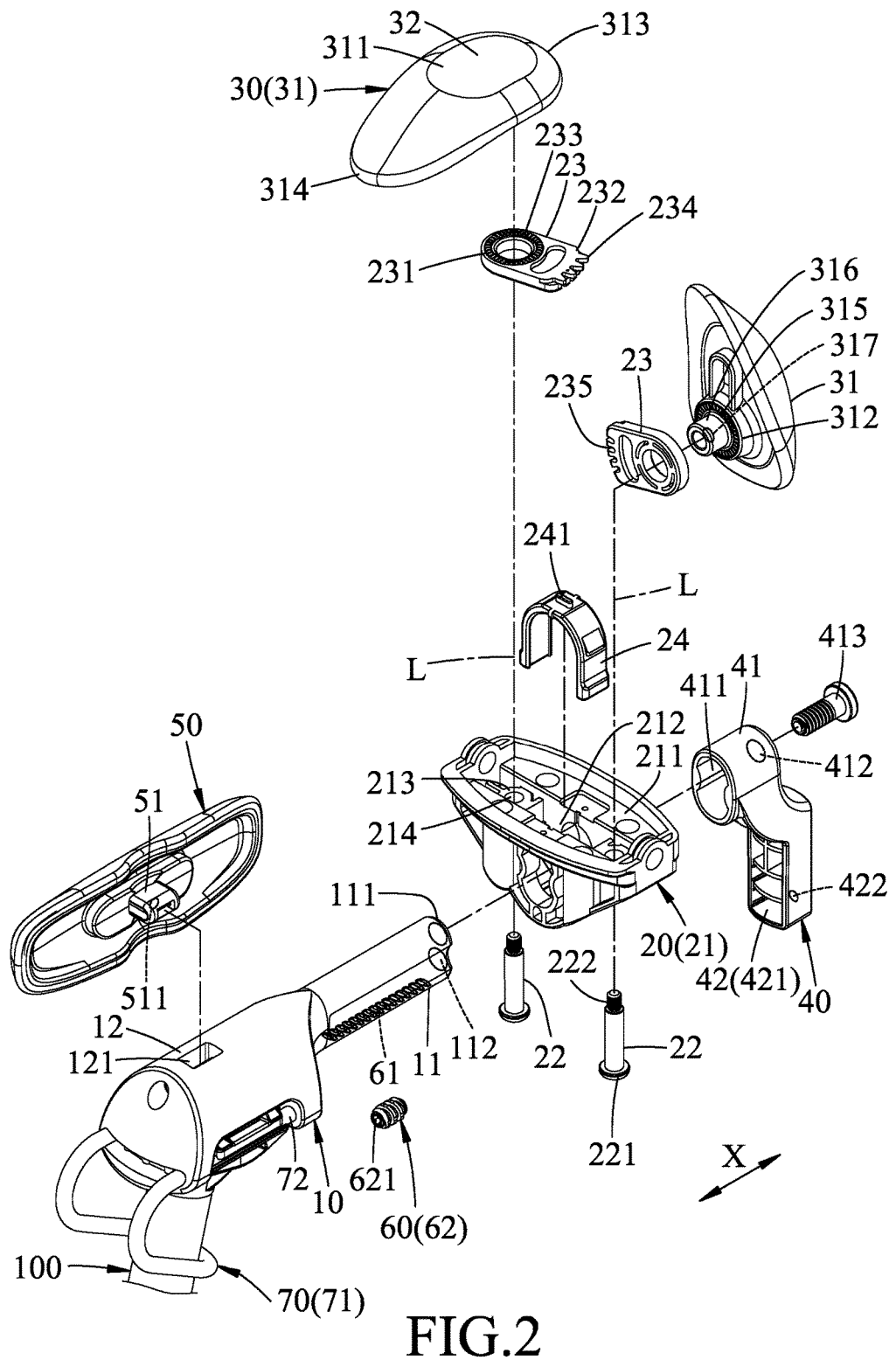
FIG. 2 is a partly exploded perspective view of the first embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1, 2, 4 and 5, the first embodiment of a saddle device according to the disclosure is adapted to be mounted to a seat post 100, and includes a first seat unit 10 connected to a top portion of the seat post 100, a second seat unit 20, a saddle unit 30, a supporting member 40, a backrest 50, an adjusting unit 60 and a reinforcing frame member 70.

The first seat unit 10 has a track portion 11 extending in a front-rear direction (X), and a front mounting portion 12 disposed in front of the track portion 11. The track portion 11 has a non-circular cross section taken perpendicular to the front-rear direction (X). In this embodiment, the track portion 11 has an 8-shaped cross section, and may be varied in other embodiments. The track portion 11 has a rear end surface 111, and two engaging holes 112 formed in the rear end surface 111, and extending in the front-rear direction (X). The front mounting portion 12 has an engaging groove 121 formed in a top surface thereof.

The second seat unit 20 is mounted to and disposed behind the first seat unit 10, and is movable on the track portion 11 of the first seat unit 10 in the front-rear direction (X). The second seat unit 20 includes a main body 21, two bolts 22 extending through the main body 21, two toothed members 23 mounted to the main body 21, and a resilient positioning member 24 mounted to the main body 21.

The main body 21 has an upper surface 211, a receiving groove 212 formed in the upper surface 211, and extending in a left-right direction which is perpendicular to the front-rear direction (X), and two positioning seats 213 fixedly disposed in the receiving groove 212. Each of the positioning seats 213 is formed with a through hole 214 extending along an axis (L) which is perpendicular to the front-rear direction (X).

The bolts 22 respectively extend through the through holes 214 of the positioning seats 213. Each of the bolts 22 has a head portion 221 abutting against a bottom portion of the main body 21, and a threaded portion 222 extending through the corresponding through hole 214.

Figure 3:
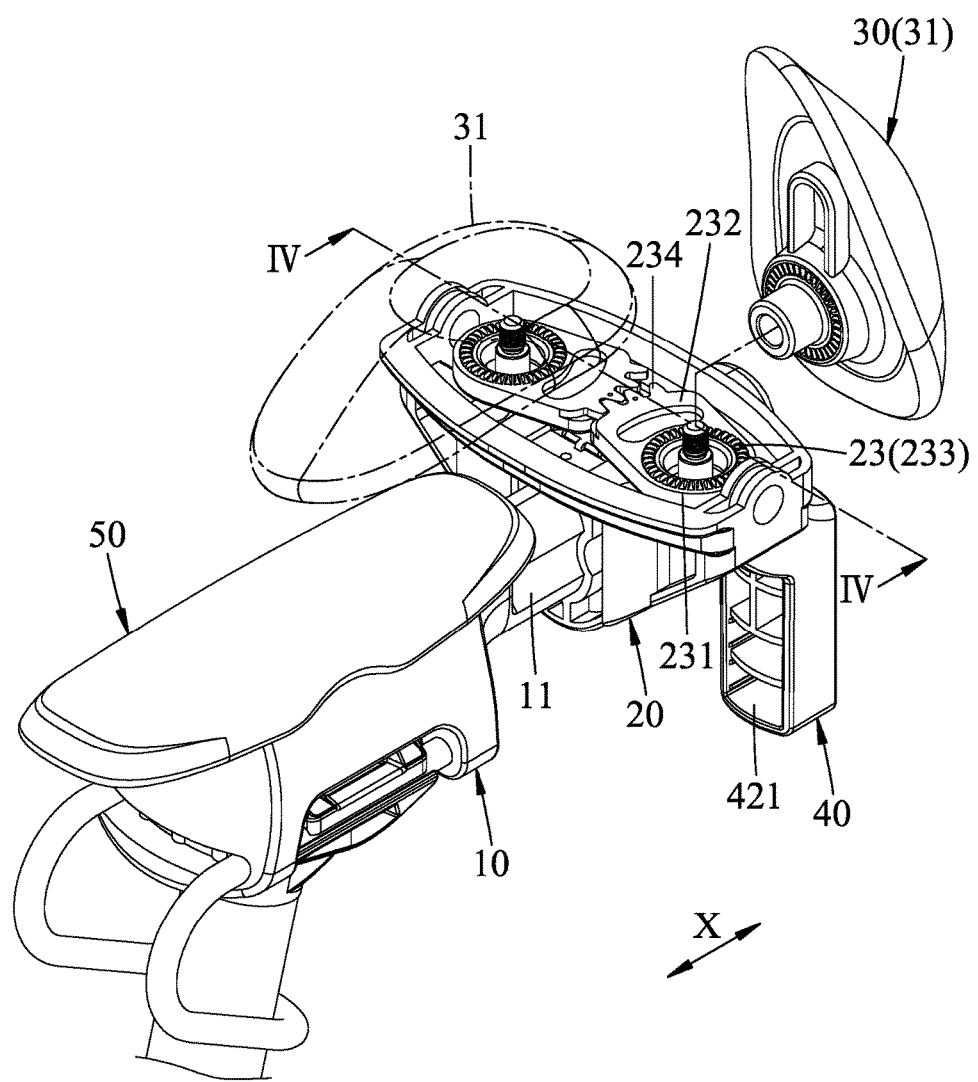
FIG. 3 is another partly exploded perspective view of the first embodiment.

Each of the toothed members 23 is mounted to the main body 21, is rotatable about a respective one of the axes (L) of the toothed members 23, and has an annular portion 231, an interacting portion 232 integrally connected to the annular portion 231, a lower crown gear portion 233 disposed at a top portion of the annular portion 231, and centered at a corresponding one of the axes (L), a plurality of finger-shaped teeth 234 formed on one end of the interacting portion 232 that is distal from the annular portion 231, and a plurality of positioning grooves 235 formed in one end of the interacting portion 232 that is distal from the annular portion 231, and disposed under the finger-shaped teeth 234. The finger-shaped teeth 234 of one of the toothed members 23 mesh with the finger-shaped teeth 234 of the other one of the toothed members 23 (see FIG. 3), such that when the one of the toothed members 23 rotates in a direction, the other one of the toothed members 23 rotates in an opposite direction.

The resilient positioning member 24 is inverted U-shaped, and has two lower ends abutting against the main body 21, and an engaging portion 241 biased to press against one of the toothed members 23, and engaging one of the positioning grooves 235 of the one of the toothed members 23. In this embodiment, the engaging portion 241 protrudes upwardly from a middle portion of the resilient positioning member 24, and such configuration may be varied in other embodiments.

The saddle unit 30 is mounted to the second seat unit 20, and includes two saddles 31 respectively corresponding to the toothed members 23 in position. Each of the saddles 31 has an upper end portion having a flat top surface 311, a lower end portion 312 opposite to the upper end portion, a rear end edge 313, a front end edge 314 opposite to the rear end edge 313, an upper crown gear portion 315 disposed at the lower end portion 312, and coaxial with the lower crown gear portion 233 of a corresponding one of the toothed members 23, and a rod segment 316 extending along the corresponding one of the axes (L), and rotatably extending through the annular portion 231 of the corresponding one of the toothed members 23. The flat top surfaces 311 of the saddles 31 cooperately form a top surface unit 32. Each of the rod segments 316 of the saddles 31 has a threaded hole 317. The upper crown gear portion 315 of each of the saddles 31 is disposed coaxially with a corresponding one of the threaded holes 317. The bolts 22 respectively and threadedly engage the threaded holes 317 of the saddles 31, so as to allow the lower crown gear portions 233 of the toothed members 23 to respectively engage the upper crown gear portions 315 of the saddles 31, thereby allowing the saddles 31 to respectively co-rotate with the toothed members 23, such that each of the bolts 22 is rotatable to allow for an adjustment to angular position of a corresponding one of the saddles 31 relative to a corresponding one of the toothed members 23. For each of the saddles 31, a distance between the front end edge 314 and the axis (L) is larger than a distance between the rear end edge 313 and the axis (L). The upper crown gear portion 315 of each of the saddles 31 meshes with the lower crown gear portion 233 of the corresponding one of the toothed members 23, such that each of the saddles 31 is rotatable relative to the corresponding one of the toothed members 23 about the corresponding one of the axes (L) of the toothed members 23 for adjusting a distance between the rear end edges 313 of the saddles 31 and a distance between the front end edges 314 of the saddles 31.

The supporting member 40 is connected to the first seat unit 10, and has a coupling end 41, and a rear mounting end portion 42 opposite to the coupling end 41 and disposed behind the second seat unit 20, and distal from the first seat unit 10. The coupling end 41 has a coupling groove 411 corresponding to the cross section of the track portion 11 in shape, and engaged with the track portion 11, and a locking hole 412 communicated with the coupling groove 411. The supporting member 40 includes a screw 413 extending through the locking hole 412 and into the coupling groove 411 to threadedly engage one of the engaging holes 112 of the track portion 11. The rear mounting end portion 42 has two mounting holes 421 juxtaposed in a direction which is parallel to the axes (L), and two fastening holes 422 respectively communicated with the mounting holes 421. In this embodiment, the shape of each of the mounting holes 421 is rectangular, and may be varied in other embodiments.

The backrest 50 has a connecting block 51 having a backrest threaded hole 511.

Figure 5:
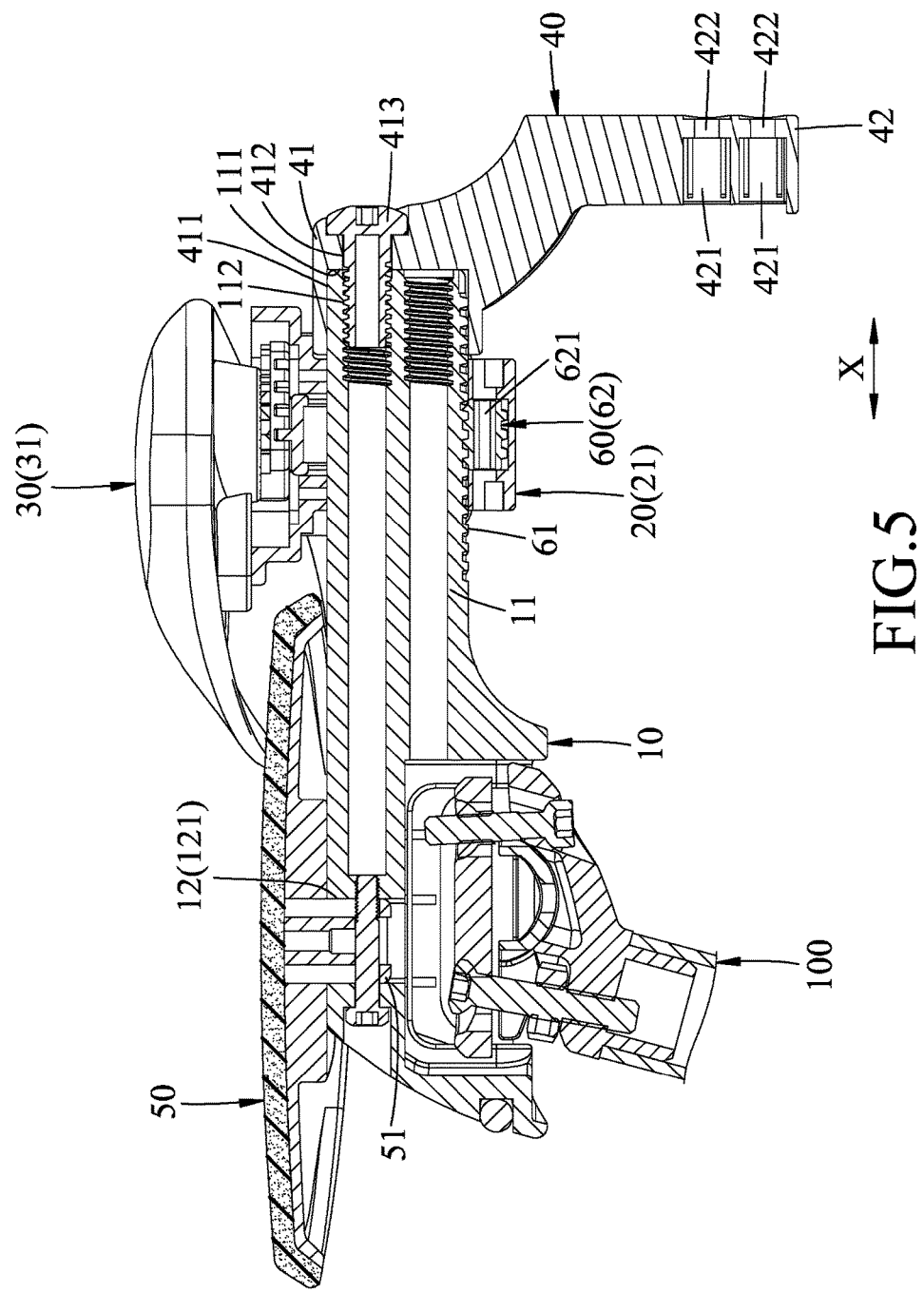
FIG. 5 is a sectional view taken along line V-V in FIG. 4.

The adjusting unit 60 is mounted between the first seat unit 10 and the second seat unit 20, and includes a rack 61 extending in the front-rear direction (X), and mounted to the track portion 11 of the first seat unit 10, and a worm 62 mounted to the main body 21 of the second seat unit 20, and meshing with the rack 61 (see FIG. 5). The worm 62 has a hexagonal hole 621 disposed for being engaged by a hex key wrench (not shown). The hex key wrench is operable to rotate the worm 62 to drive a relative movement between the first and second seat units 10, 20 in the front-rear direction (X).

The reinforcing frame member 70 has a U-shaped rod part 71 adapted to be disposed around the seat post 100, and a connecting rod part 72 connected to the U-shaped rod part 71, and securely inserted into the first seat unit 10.

During operation, the supporting member 40 is transformable between a lifted position (see FIG. 6) and a lowered position (see FIG. 1) such that, when the supporting member 40 is at the lifted position, the rear mounting end portion 42 is located above the top surface unit 32 of the saddle unit 30, and when the supporting member 40 is at the lowered position, the rear mounting end portion 42 is located below the top surface unit 32 of the saddle unit 30.

The backrest 50 is mountable to the rear mounting end portion 42 when the supporting member 40 is at the lifted position, such that the backrest 50 is disposed behind the saddle unit 30, and is mountable to the front mounting portion 12 when the supporting member 40 is at the lowered position, such that the backrest 50 is disposed in front of the saddle unit 30. When the supporting member 40 is at the lifted position, a screw extends through a corresponding one of the fastening holes 422, and threadedly engages the backrest threaded hole 511 to fasten the backrest 50 to the supporting member 40. When the supporting member 40 is at the lowered position, the connecting block 51 engages the engaging groove 121 of the front mounting portion 12.

When the supporting member 40 is at the lowered position, a saddle bag 200 which is disposed for receiving repairing tools, repairing members and a wallet is fastened to the rear mounting end portion 42 by a screw (not shown). As shown in FIG. 5, the backrest 50 is fastened to the front mounting portion 12 by a screw, such that the backrest 50 is prevented from being removed from the front mounting portion 12. Therefore, the disposition of the backrest 50 not only increases the support to the saddle unit 30, but also reduces the space occupied when it is not used.

Figure 6:
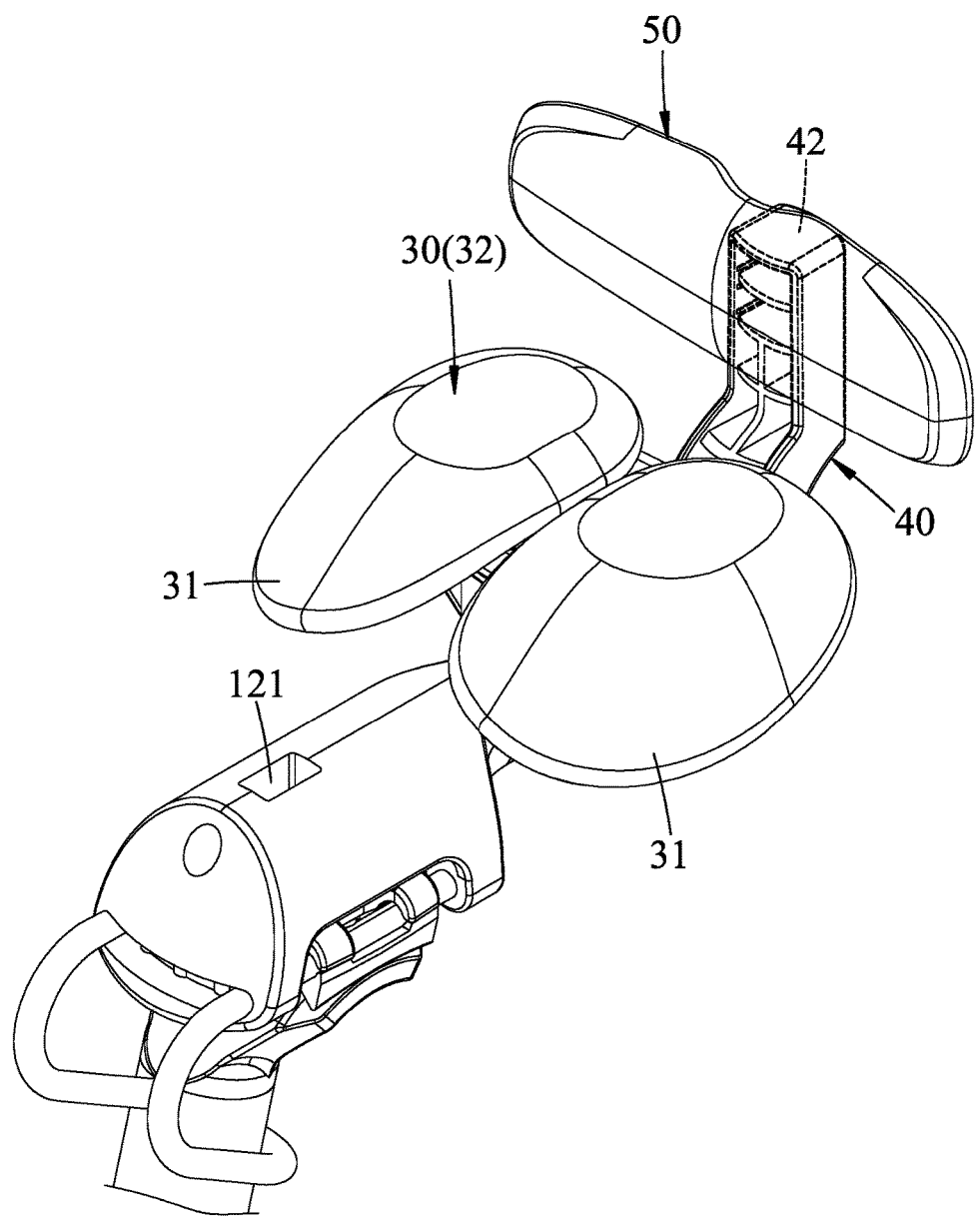
FIG. 6 is a schematic perspective view of the first embodiment, and illustrates that a supporting member is at a lifted position, and a backrest is mounted to the supporting member.

When the supporting member 40 is required to transform from the lowered position to the lifted position, a user firstly needs to remove the saddle bag 200, then operates the screw 413 to remove the supporting member 40 from the track portion 11. The supporting member 40 is then flipped 180 degrees relative to the first seat unit 10, and is subsequently mounted back to the track portion 11. As shown in FIG. 6, at the lifted position, the backrest 50 can be mounted to the rear mounting end portion 42 for supporting the back of the user. Since the backrest 50 is fastened to the rear mounting end portion 42 by the screw, the backrest 50 is prevented from being removed from the supporting member 40.

As shown in FIG. 5, to adjust the position of the second seat unit 20 and the saddle unit 30 on the track portion 11, the user needs to operate the hex key wrench to rotate the worm 62 to drive the relative movement between the second seat unit 20 and the first seat unit 10.

Figure 4:
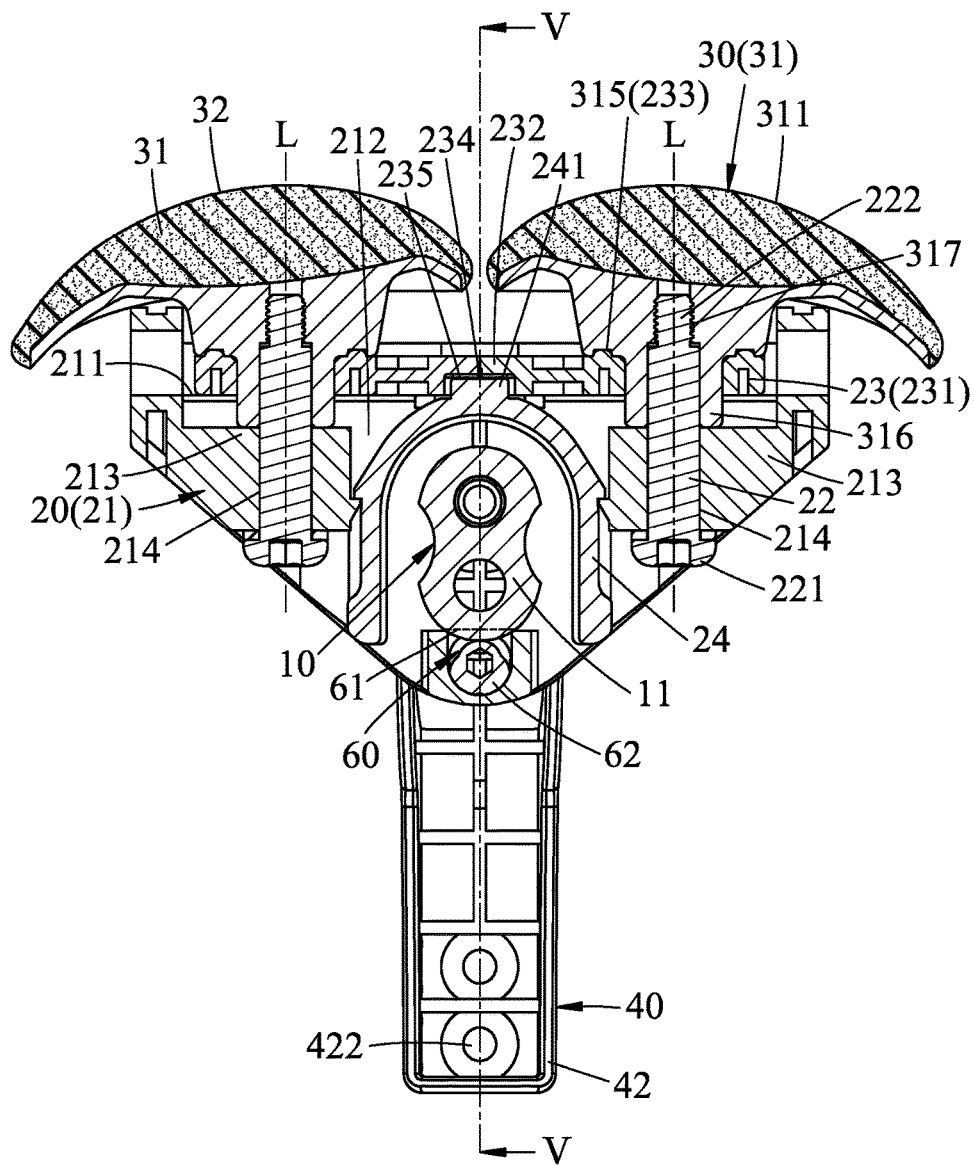
FIG. 4 is a sectional view taken along line IV-IV in FIG. 3.
Figure 7:
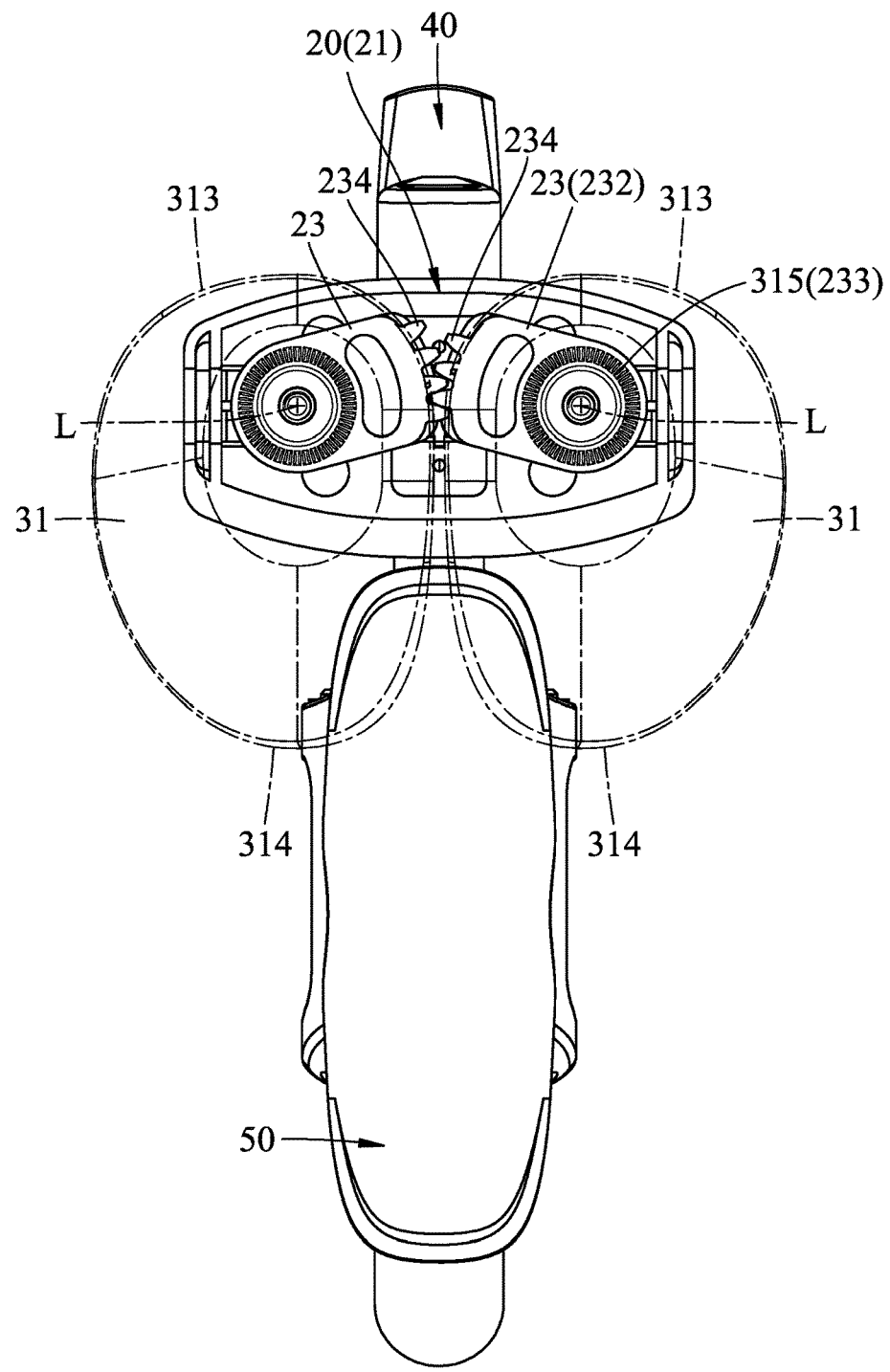
FIG. 7 is a schematic top view of the first embodiment.
Figure 8:
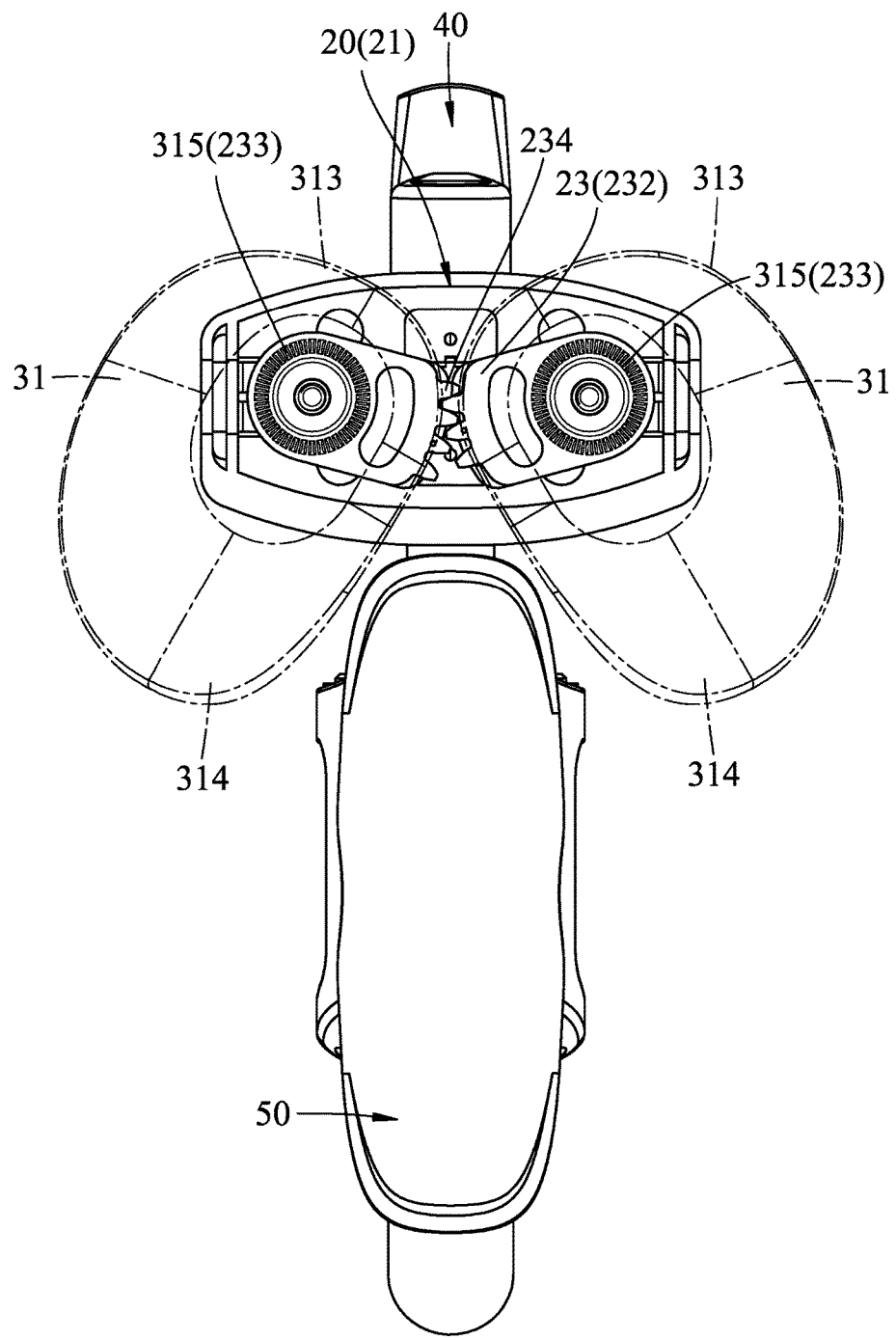
FIG. 8 is a view similar to FIG. 7 but illustrating position adjustment of two saddles.

To adjust the distance between the rear end edges 313 of the saddles 31 and the distance between the front end edges 314 of the saddles 31, as shown in FIGS. 7 and 8, the user needs to rotate one of the saddles 31. When the one of the saddles 31 is rotated direction, the upper crown gear portion 315 of the one of the saddles 31 co-rotates with the lower crown gear portion 233 of the corresponding one of the toothed members 23, such that the corresponding one of the toothed members 23 is simultaneously rotated by the one of the saddles 31. At the same moment, the finger-shaped teeth 234 of the corresponding one of the toothed members 23 meshes with the finger-shaped teeth 234 of the other one of the toothed members 23, such that the other one of the saddles is driven to rotate in an opposite direction. When the saddles 31 are rotated, as shown in FIG. 4, the positioning grooves 235 rotate relative to the engaging portion 241 of the resilient positioning member 24, so that a clicking sound is generated until the saddles 31 stop to rotate. Since the engaging portion 241 engages the corresponding one of the positioning grooves 235, the positions of the toothed members 23 are fixed relative to the main body 21, and the saddles 31 are also positioned.

It should be noted that, the user may rotate the bolts 22 first so that, when one of the saddles 31 is rotated by the user, the one of the saddles 31 is rotated relative to a corresponding one of the toothed members 23, the angular position of the one of the saddles 31 relative to the corresponding one of the toothed members 23 is adjusted, and the distance between the rear end edges 313 of the saddles 31 and the distance between the front end edges 314 of the saddles 31 are also adjusted.

As such, the position of the supporting member 40, the position of the second seat unit 20 and the saddle unit 30 on the track portion 11, and the distance between the rear end edges 313 of the saddles 31 and the distance between the front end edges 314 of the saddles 31 are adjustable by the user to meet the operation requirements.

It should be noted that, the shape of the saddles 31 may be varied based on different physiological conditions in other embodiments.

Figure 9:
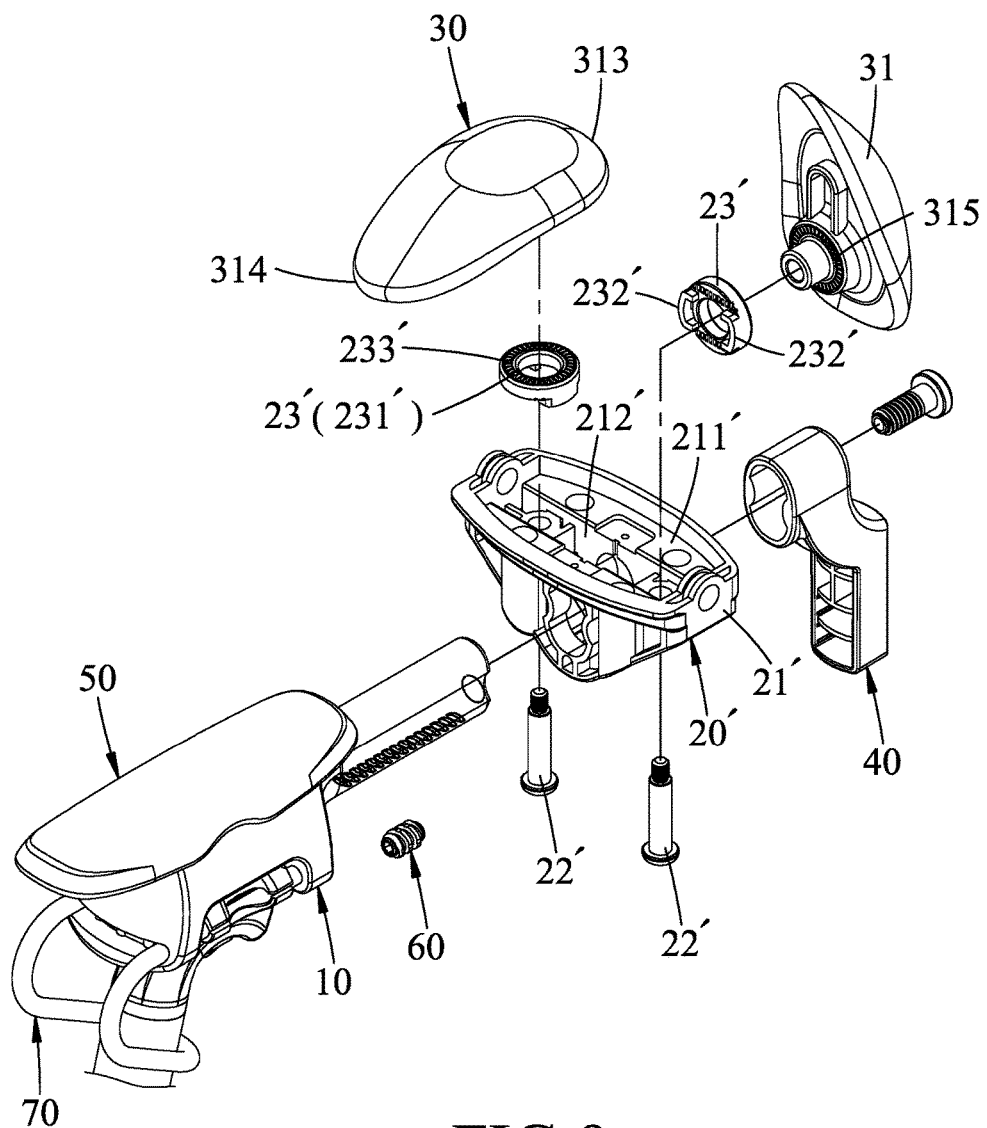
FIG. 9 is a partly exploded perspective view of a second embodiment of the saddle device according to the disclosure.
Figure 10:
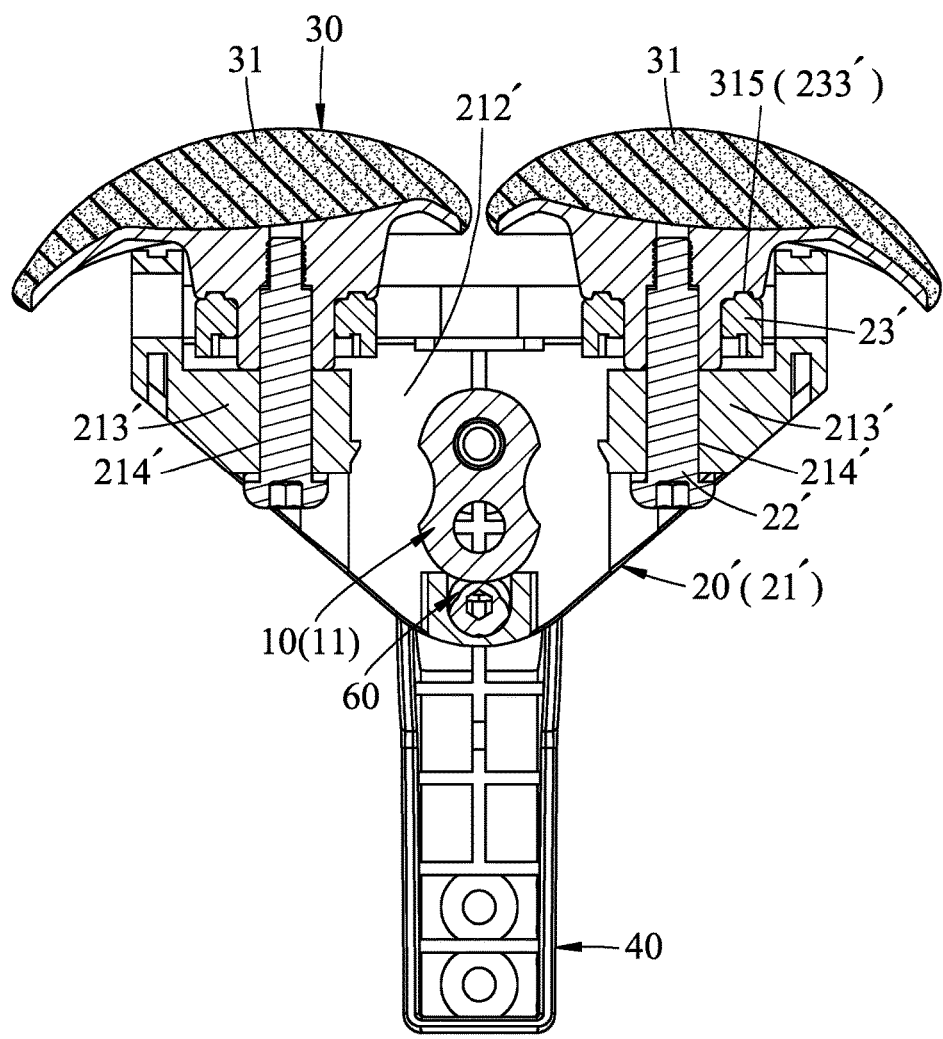
FIG. 10 is a sectional view of the second embodiment.

Referring to FIGS. 9 and 10, the second embodiment of the saddle device according to the disclosure has a structure similar to that of the first embodiment. The main difference between this embodiment and the previous embodiment resides in the configuration of the second seat unit 20'.

The second seat unit 20' includes a main body 21' having a receiving groove 212' that extends in the left-right direction which is perpendicular to the front-rear direction (X), two bolts 22' extending through the main body 21', and two toothed members 23' non-rotatably mounted to the main body 21'. Each of the toothed members 23' has an annular portion 231', two engaging blocks 232' connected to a bottom portion of the annular portion 231', and engaging the receiving groove 212' such that they cannot be rotated within the receiving grooves 212', and a lower crown gear portion 233' disposed at a top portion of the annular portion 231', and centered at an axis (L). The upper crown gear portions 315 of the saddles 31 respectively mesh with the lower crown gear portion 233' of the toothed members 23'.

When the user needs to adjust the angular position of one of the saddles 31, the corresponding bolt 22 is loosened such that it remains in the corresponding threaded hole 317 of the corresponding saddle 31, and the one of the saddles 31 is removed from and rotated relative to the corresponding toothed member 23 to adjust the angular position of the one of the saddles 31. After the adjustment is completed, the corresponding bolt 22 is tightened such that the corresponding upper and lower crown gears 315, 233' mesh with each other, thereby maintaining the angular position of the one of the saddles 31.

The second embodiment has the same advantages as those of the first embodiment, and therefore the operation requirements also can be met.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A saddle device comprising:
   a first seat unit having a track portion that extends in a front-rear direction;
   a second seat unit mounted to and disposed behind said first seat unit, and movable on said first seat unit in the front-rear direction;
   a saddle unit mounted to said second seat unit, and having a top surface unit;
   a supporting member connected to said first seat unit, having a rear mounting end portion that is distal from said first seat unit and that is disposed behind said second seat unit, and transformable between a lifted position and a lowered position such that, when said supporting member is at the lifted position, said rear mounting end portion is located above said top surface unit of said saddle unit, and when said supporting member is at the lowered position, said rear mounting end portion is located below said top surface unit of said saddle unit; and a backrest mountable to said rear mounting end portion when said supporting member is at the lifted position, such that said backrest is disposed behind said saddle unit.

2. The saddle device as claimed in claim 1, further comprising an adjusting unit mounted between said first seat unit and said second seat unit, and including a rack that extends in the front-rear direction, and that is mounted to said track portion of said first seat unit, and a worm that is mounted to said second seat unit, that meshes with said rack, and that is operable to drive a relative movement between said first and second seat units in the front-rear direction.

3. The saddle device as claimed in claim 1, wherein:

said second seat unit includes a main body, and two toothed members mounted to said main body;

each of said toothed members is rotatable relative to said main body about an axis which is perpendicular to the front-rear direction, and has a lower crown gear portion disposed at a top portion of a corresponding one of said toothed members, and centered at the axis;

said saddle unit includes two saddles respectively corresponding to said toothed members in position;

each of said saddles has an upper end portion having a flat top surface, a lower end portion opposite to said upper end portion, a rear end edge, a front end edge opposite to said rear end edge, and an upper crown gear portion disposed at said lower end portion, and coaxially corresponding to said lower crown gear portion of a corresponding one of said toothed members in position;

said flat top surfaces of said saddles cooperately form said top surface unit;

for each of said saddles, a distance between said front end edge and the axis is larger than a distance between said rear end edge and the axis; and said upper crown gear portion of each of said saddles meshes with said lower crown gear portion of the corresponding one of said toothed members, such that each of said saddles is rotatable relative to the corresponding one of said toothed members about a corresponding one of the axes of said toothed members for adjusting a distance between said rear end edges of said saddles and a distance between said front end edges of said saddles.

4. The saddle device as claimed in claim 3, wherein:

said main body of said second seat unit has an upper surface, a receiving groove formed in said upper surface, and two positioning seats fixedly disposed in said receiving groove;

each of said positioning seats is formed with a through hole extending along the corresponding one of the axes;

each of said toothed members is non-rotatably mounted to said main body, and further has an annular portion, and two engaging blocks connected to a bottom portion of said annular portion, and engaging said receiving groove;

said second seat unit further includes two bolts respectively extending through said through holes of said positioning seats;

each of said saddles further has a threaded hole, said upper crown gear portion of each of said saddles being disposed coaxially with a corresponding one of said threaded holes; and said bolts respectively engage said threaded holes of said saddles, so as to allow said lower crown gear portions of said toothed members to respectively engage said upper crown gear portions of said saddles, thereby allowing said saddles to respectively co-rotate with said toothed members, such that each of said bolts is rotatable to allow for an adjustment to angular position of a corresponding one of said saddles relative to a corresponding one of said toothed members.

5. The saddle device as claimed in claim 3, wherein:

each of said toothed members is rotatably mounted to said main body, and further has an annular portion, and an interacting portion integrally connected to said annular portion;

for each of said toothed members, one end of said interacting portion that is distal from said annular portion is formed with a plurality of finger-shaped teeth; and said finger-shaped teeth of one of said toothed members mesh with said finger-shaped teeth of the other one of said toothed members, such that when the one of said toothed members rotates in a direction, the other one of said toothed members rotates in an opposite direction.

6. The saddle device as claimed in claim 5, wherein:

said second seat unit further includes a resilient positioning member mounted to said main body, and having an engaging portion;

each of said toothed members further has a plurality of positioning grooves formed in one end of said interacting portion that is distal from said annular portion, and disposed under said finger-shaped teeth; and said engaging portion of said resilient positioning member is biased to press against one of said toothed members and engages one of said positioning grooves of the one of said toothed members.

7. The saddle device as claimed in claim 1, wherein said first seat unit further has a front mounting portion disposed in front of said track portion, said backrest being mountable to said front mounting portion when said supporting member is at the lowered position.

8. The saddle device as claimed in claim 1 is adapted to be mounted to a seat post, said first seat unit being connected to a top portion of the seat post, said saddle device further comprising:

a reinforcing frame member having a U-shaped rod part that is adapted to be disposed around the seat post, and a connecting rod part that is connected to said U-shaped rod part, and that is securely inserted into said first seat unit.

* * * * *